UNITED STATES PATENT OFFICE.

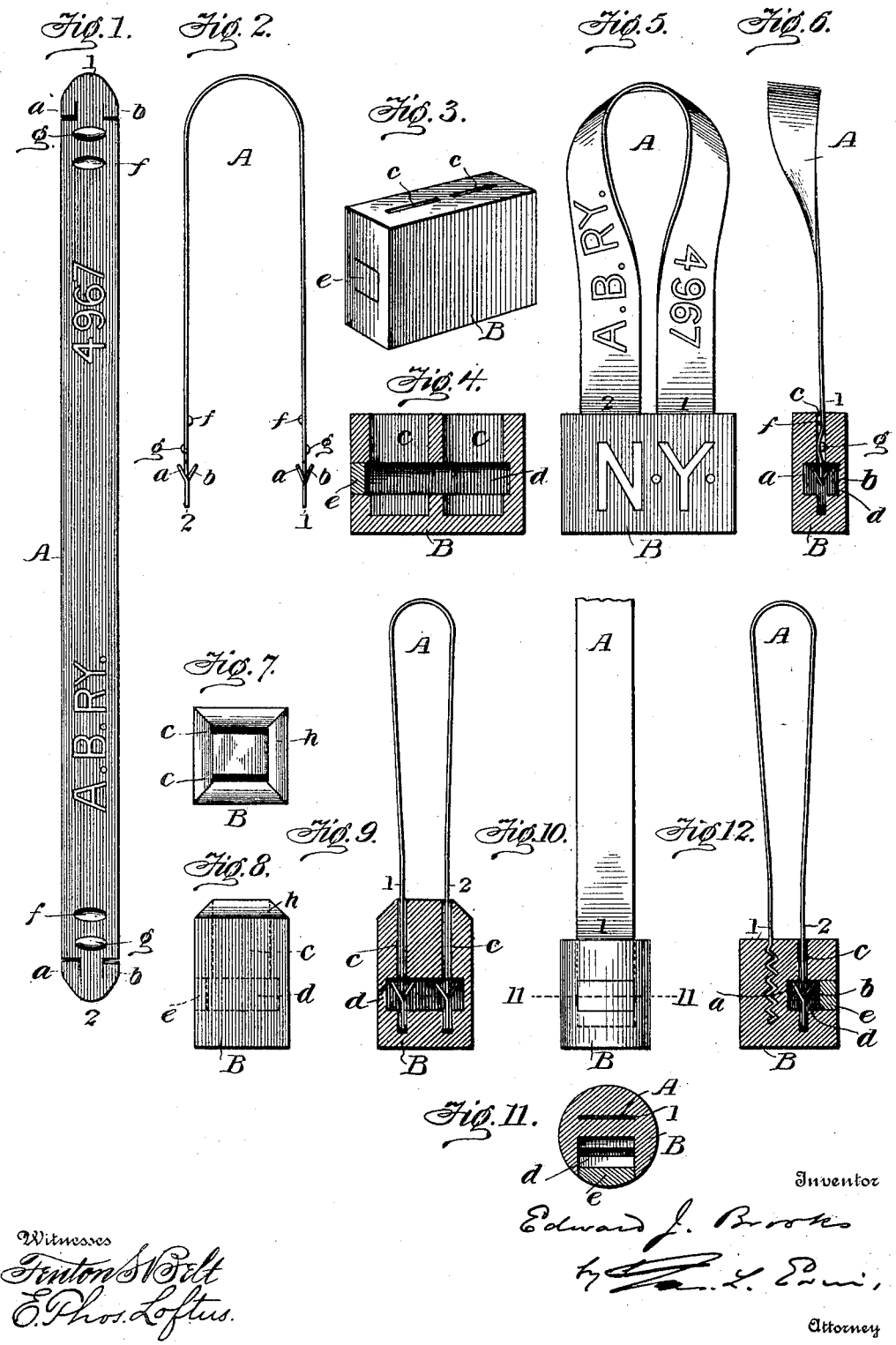

EDWARD J. BROOKS, OF EAST ORANGE, NEW JERSEY.

SNAP-SEAL.

SPECIFICATION forming part of Letters Patent No. 673,996, dated May 14, 1901.

Application filed December 15, 1900. Serial No. 40,026. (No model.)

*To all whom it may concern:*

Be it known that I, EDWARD J. BROOKS, a citizen of the United States of America, and a resident of East Orange, in the State of New Jersey, have invented a new and useful Improvement in Snap-Seals, of which the following is a specification.

Self-fastening or "snap" seals for use as substitutes for press-fastened seals to secure the doors of railway freight-cars and for like purposes must, in order to be practicable, be capable of manufacture at a low cost, as well as free from liability to become inoperative from rough handling, easy to apply at the sealing operation, and incapable of being unfastened without destroying the shackle or the seal part or so defacing one or the other, or both, as to insure detection.

The leading object of the present invention is to produce a snap-seal having all the necessary characteristics of a reasonably inexpensive and safe substitute for press-fastened seals.

The invention consists in an improved snap-seal and certain novel combinations of parts embodied in the same, as hereinafter set forth and claimed.

A sheet of drawings accompanies this specification as part thereof.

Figure 1 of these drawings is a face view of the shackle of an improved seal, flat. Fig. 2 is an edge view of the same doubled. Fig. 3 is a perspective view of a companion seal part detached. Fig. 4 is a sectional view of said seal part. Fig. 5 is a face view of the improved seal formed by uniting said shackle and seal part. Fig. 6 is a sectional edge view of the same. Figs. 7 and 8 are top and side views of an alternative seal part, and Fig. 9 is a sectional edge view of an improved seal embodying said alternative seal part. Fig. 10 is an elevation of another modified seal unfastened. Fig. 11 represents a section on the line 11 11, Fig. 10; and Fig. 12 is a sectional edge view of said modified seal fastened.

Like letters and numbers refer to like parts in all the figures.

The improved snap-seal in each of its forms is composed of a flexible shackle A, of tinplate (tin) or other suitable sheet metal, and a molded seal part B, either frangible or not frangible, made from any suitable material, but preferably from an inexpensive plastic composition.

Of the shackle ends 1 and 2 the latter, at least, is provided with snap-catches $a$ and $b$, integral with the body of the shackle and projecting on both sides of the shackle end, and the seal part B is molded with a narrow inlet $c$, adapted to barely admit such shackle end, and with a chamber $d$, of greater width, extending across said inlet and forming at the intersection of the two square shoulders within the seal part to interlock with said catches $a$ and $b$ at the sealing operation. The other shackle end, for the purposes of this invention, broadly considered, may be inseparably attached to the seal part in any practicable way.

The snap-catches $a$ and $b$ are in all cases formed by L-shaped incisions, extending inward and toward the extremity near the end of the shackle, as shown in Fig. 1, and are adapted to be sprung back into the plane of the body of the shackle, so that the inlets $c$ may be contracted in width, as aforesaid, and tampering with the catches thus rendered difficult or impossible. The chamber $d$ is also in all cases molded with one open end, which is permanently closed by means of a plug $e$. This may be done before or after the induration of the seal part if it be made from a plastic composition. The seal part is then and finally dipped in paint or otherwise provided with a coating to conceal the joint around the plug $e$ and to insure detection should an attempt be made to remove it. The coating (of different colors) may also serve to distinguish the seals of different roads.

With the seal part attached to the end 1 of the shackle A and the shackle end 2 free the latter is passed through a pair of sealing-staples or the like and is then thrust into the inlet $c$, provided for its reception in the seal part B, and a click attests the automatic fastening of the seal. In removing the seal the shackle may be cut, or the seal part, if it is frangible, as set forth in my specifications forming parts of Patents Nos. 303,417, 345,764, &c., may be broken to free the shackle ends.

In the species represented by Figs. 1 to 6, inclusive, both ends of the shackle A are provided with the snap-catches *a* and *b* and also with projections *f* and *g* on the respective sides of the shackle to fill the inlet *c*, above the catches, as in Fig. 6. Tampering with the catches may thus be further prevented, and the inlets may consequently be less contracted than is otherwise essential to safety. The ends of the shackle are also provided, respectively, with distinguishing-marks "A. B. Ry." and "4967" on its face, representing the name of a railway-line and a serial number. The marks may be of any approved character. In order to bring both marks to the front in the fastened seal, Figs. 5 and 6, the seal part B is provided with its pair of inlets *c*, in line with each other edgewise and parallel with the front of the seal part. The seal part is thus adapted also to be made thin and with a large face, which may be provided with the initials or name of a sealing station or terminus, or other distinguishing-marks, as represented by "N. Y." in Fig. 5.

In the species represented by Figs. 7, 8, and 9 a pair of contracted inlets *c* are arranged parallel with each other, and bevels *h* form watersheds.

In the species represented by Figs. 10, 11, and 12 the end 1 of the shackle A is provided with anchoring-crimps, and the seal part B is molded upon the same and provided with a single inlet *c* to receive the shackle end 2, with its catches *a* and *b*.

The shackle as well as the seal part may be coated with a distinguishing color, and in all the species suitable distinguishing-marks will be used on the shackle and seal part, either or both, as may be desired.

Instead of the projections *f* and *g*, guards or masks may be cast on or otherwise attached to the shackle ends, as set forth in said specification forming part of Patent No. 345,764, and other like modifications will suggest themselves to those skilled in the art.

Having thus described said improvement, I claim as my invention and desire to patent under this specification—

1. An improved snap-seal composed of a flexible shackle of sheet metal and a seal part, with means for securing one end of the shackle to said seal part, the other shackle end having a pair of snap-catches integral with the body of the shackle and normally projecting from the respective sides of the shackle end, formed by L-shaped incisions at the edges of the shackle end, and adapted to be sprung back into the plane of the body of the shackle, and the seal part having an inlet for said other shackle end contracted in its width corresponding to the thickness of the shackle end, and crossed by a chamber of greater width forming a pair of shoulders within the seal part to coact with said snap-catches of the shackle at the sealing operation.

2. A flexible sheet-metal shackle having at one end a pair of snap-catches integral with the body of the shackle and normally projecting from the respective sides of the shackle end, formed by incisions at the edges of the shackle end, and adapted to be sprung back into the plane of the body of the shackle, and projections on the respective sides of the shackle end to guard the respective catches, in combination with a seal part and means for securing the other end of the shackle thereto, and having, for the reception of the first-mentioned shackle end, constructed as aforesaid, an inlet contracted in its width corresponding to the thickness of the shackle end and crossed by a chamber of greater width forming a pair of shoulders within the seal part to coact with the snap-catches of said first-mentioned shackle end.

3. In combination with a flexible shackle of sheet metal having at one end a pair of snap-catches integral with the body of the shackle and normally projecting from its respective sides, formed by incisions at the edges of the shackle end, and adapted to be sprung back into the plane of the body of the shackle, a seal part and means for securing the other end of the shackle thereto, said seal part having for the reception of the first-mentioned shackle end, constructed as aforesaid, an inlet contracted in its width corresponding to the thickness of the shackle and crossed by a chamber of greater width forming a pair of shoulders within the seal part to coact with the snap-catches of said first-mentioned shackle end, such chamber extending inwardly from one side of the seal part, and having its other end permanently plugged.

4. The combination, in a snap-seal, of a flexible shackle of sheet metal having one side provided with distinguishing-marks, and having at one end a pair of snap-catches integral with the body of the shackle and normally projecting from its respective sides, formed by incisions at the edges of the shackle end, and adapted to be sprung back into the plane of the body of the shackle, a seal part and means for securing the other end of said shackle thereto, said seal part having for the reception of the first-mentioned shackle end, constructed as aforesaid, an inlet contracted in its width corresponding to the thickness of the shackle, and crossed by a chamber of greater width forming a pair of shoulders within the seal part to coact with the snap-catches of said first-mentioned shackle end, the two shackle ends being in line with each other edgewise in the fastened seal and parallel with its front, whereby the distinguishing-marks on both shackle ends are exposed at the front of the seal.

5. The combination, in a snap-seal, of a flexible shackle of sheet metal, having both ends provided with distinguishing-marks, and having at each end a pair of snap-catches integral with the body of the shackle and normally projecting from the respective sides of the shackle, formed by incisions at the edges of the shackle end, and adapted to be sprung back into the plane of the body of the shackle, and a seal part having an inlet for each shackle end contracted in its width corresponding to the thickness of the shackle, and crossed by a chamber of greater width forming a pair of
5 shoulders within the seal part to coact with the snap-catches of both shackle ends, said inlets being arranged in line with each other edgewise and parallel with the front of the seal part, substantially as hereinbefore specified, for the purposes set forth.

EDWARD J. BROOKS.

Witnesses:
THOMAS TIERNEY,
CHAS. H. IVES.